United States Patent
Hasegawa et al.

(10) Patent No.: US 10,408,953 B1
(45) Date of Patent: Sep. 10, 2019

(54) RADIATION DETECTOR

(71) Applicant: KABUSHIKI KAISHA TOSHIBA, Minato-ku (JP)

(72) Inventors: Rei Hasegawa, Yokohama (JP); Kohei Nakayama, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/119,846

(22) Filed: Aug. 31, 2018

(30) Foreign Application Priority Data

Feb. 22, 2018 (JP) .................................. 2018-030113

(51) Int. Cl.
*G01T 1/24* (2006.01)
*G01T 1/18* (2006.01)
*G01T 1/38* (2006.01)

(52) U.S. Cl.
CPC ................ *G01T 1/247* (2013.01); *G01T 1/18* (2013.01); *G01T 1/38* (2013.01)

(58) Field of Classification Search
CPC .. G01T 1/24; G01T 1/29; G01T 1/247; G01T 1/00; G01T 1/18; G01T 1/38
See application file for complete search history.

(56) References Cited

U.S. PATENT DOCUMENTS

| | | | | |
|---|---|---|---|---|
| 3,626,189 A | * | 12/1971 | Berg | .......................... G01T 1/29 |
| | | | | 250/385.1 |
| 3,694,655 A | * | 9/1972 | Auer | ..................... G01T 1/2935 |
| | | | | 250/389 |
| 3,891,851 A | * | 6/1975 | Fletcher | ................ G01T 1/2914 |
| | | | | 250/385.1 |
| 4,262,203 A | * | 4/1981 | Overhoff | ................... G01T 1/38 |
| | | | | 250/374 |
| 6,570,160 B1 | | 5/2003 | Maekawa et al. | |
| 9,761,631 B2 | | 9/2017 | Fujita et al. | |
| 2014/0225094 A1 | * | 8/2014 | Fraboni | ............... H01L 51/0003 |
| | | | | 257/40 |

FOREIGN PATENT DOCUMENTS

| | | |
|---|---|---|
| JP | 3-3198 | 1/1991 |
| JP | 6-27849 | 4/1994 |
| JP | 2000-193749 | 7/2000 |
| JP | 2014-529728 | 11/2014 |
| JP | 2015-115357 | 6/2015 |
| JP | 5976429 | 8/2016 |

* cited by examiner

*Primary Examiner* — Kiho Kim
(74) *Attorney, Agent, or Firm* — Oblon, McClelland, Maier & Neustadt, L.L.P.

(57) ABSTRACT

According to one embodiment, a radiation detector includes a metal member, a capacitor, and a first charge-sensitive amplifier. The metal member includes a first portion and a second portion. The capacitor is electrically connected to the second portion. The first charge-sensitive amplifier is electrically connected to the first portion. The first charge-sensitive amplifier outputs a signal corresponding to α-rays incident on the metal member.

14 Claims, 15 Drawing Sheets

RADIATION DETECTOR

CROSS-REFERENCE TO RELATED APPLICATIONS

This application is based upon and claims the benefit of priority from Japanese Patent Application No. 2018-030113, filed on Feb. 22, 2018; the entire contents of which are incorporated herein by reference.

FIELD

Embodiments described herein relate generally to a radiation detector.

BACKGROUND

For example, it is desirable to obtain high detection sensitivity and high detection selectivity in a radiation detector.

DETAILED DESCRIPTION

Figure 1A:
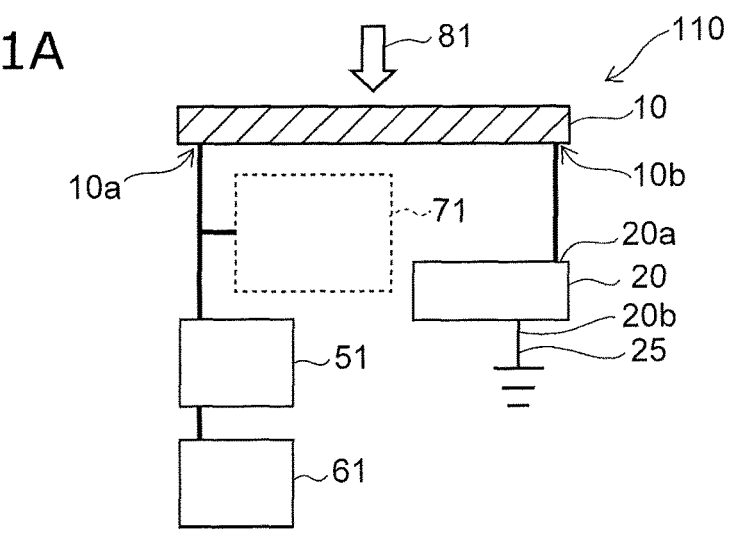
FIG. 1A to FIG. 1C are schematic views illustrating radiation detectors according to a first embodiment.

According to one embodiment, a radiation detector includes a metal member, a capacitor, and a first charge-sensitive amplifier. The metal member includes a first portion and a second portion. The capacitor is electrically connected to the second portion. The first charge-sensitive amplifier is electrically connected to the first portion. The first charge-sensitive amplifier outputs a signal corresponding to α-rays incident on the metal member.

According to another embodiment, a radiation detector includes a housing, a metal member, a capacitor, and a first charge-sensitive amplifier. The metal member includes a first portion and a second portion. At least a portion of the metal member is not covered with the housing. The capacitor is electrically connected to the second portion. The first charge-sensitive amplifier is electrically connected to the first portion.

According to another embodiment, a radiation detector includes a metal member, a first radiation detecting portion, and a first charge-sensitive amplifier. The metal member includes a first portion and a second portion. The first radiation detecting portion detects radiation including at least one selected from the group consisting of β-rays and γ-rays. A third portion of the first radiation detecting portion is electrically connected to the second portion. The first charge-sensitive amplifier is electrically connected to the first portion. The first charge-sensitive amplifier outputs a first signal corresponding to α-rays incident on the metal member.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
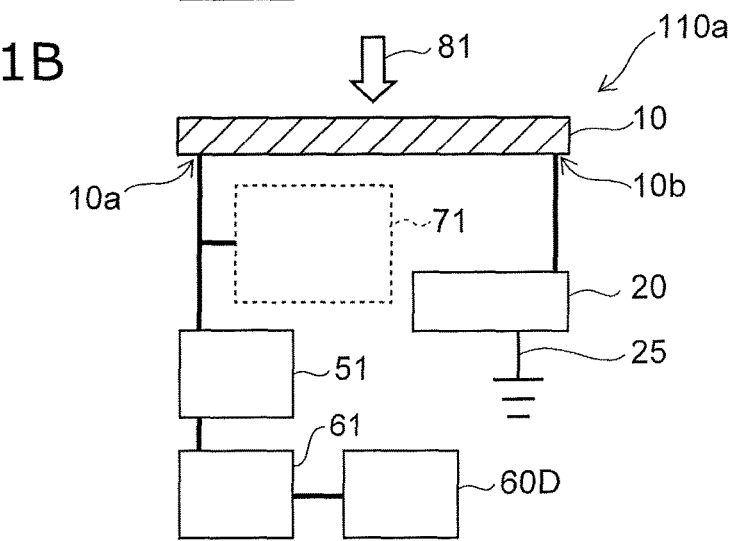
Figure 1C:
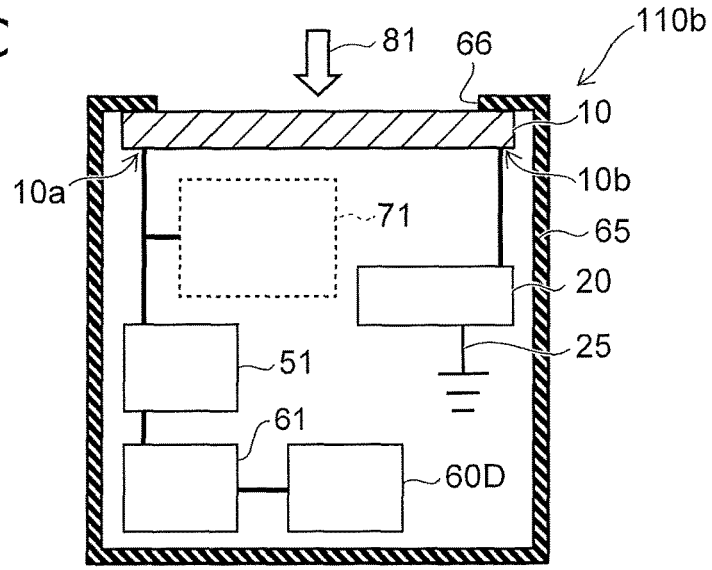

FIG. 1A to FIG. 1C are schematic views illustrating radiation detectors according to a first embodiment.

As shown in FIG. 1A, a radiation detector 110 according to the embodiment includes a metal member 10, a capacitor 20, and a first charge-sensitive amplifier 51.

The metal member 10 may be, for example, a metal layer. The metal member 10 includes a first portion 10a and a second portion 10b. For example, the first portion 10a may be one end portion of the metal member 10. The second portion 10b may be another one end portion of the metal member 10. These end portions are separated from each other. For example, radiation 81 can be incident on the region between the first portion 10a and the second portion 10b. The radiation 81 is, for example, α-rays.

The capacitor 20 is electrically connected to the second portion 10b. For example, the capacitor 20 includes a first terminal 20a and a second terminal 20b. The first terminal 20a is electrically connected to the second portion 10b. For example, the second terminal 20b is set to a first potential 25. The first potential 25 may be, for example, a ground potential. The first potential 25 may be, for example, one potential (a reference potential) provided in the radiation detector 110.

The first charge-sensitive amplifier 51 is electrically connected to the first portion 10a. For example, the first charge-sensitive amplifier 51 outputs a signal corresponding to the radiation 81 (e.g., the α-rays) incident on the metal member 10.

A first potential setter 71 is provided in the example. The first potential setter 71 may be included in the radiation detector 110. The first potential setter 71 may be provided separately from the radiation detector 110. The first potential setter 71 is electrically connected to the first portion 10a. The first potential setter 71 sets the potential of the first portion 10a to be different from the first potential 25 (e.g., the ground potential). The difference between the potential of the first portion 10a and the potential of the first potential 25 is set to be 20 V or more. Thereby, for example, good sensitivity is obtained. The difference between the potentials may be, for example, 200 V or less. Thereby, for example, the noise can be suppressed. For example, the first potential 25 is 0 volts; and the potential of the first portion 10a is set to about −50 V to −20 V. Thus, a negative bias voltage is applied to the metal member 10.

It was found that an electrical signal that corresponds to the α-rays is obtained from the first charge-sensitive amplifier 51 when the α-rays are incident on the metal member 10 in such a state. The electrical signal is measured by a first processor 61. The first processor 61 is, for example, a measurement part.

The radiation detector according to the embodiment may include an outputter 60D as in a radiation detector 110a shown in FIG. 1B. The outputter 60D outputs information based on the output of the first processor 61. The outputter 60D is, for example, a display device. The outputter 60D may be a transmitting device. The outputter 60D may transmit, to another device, the information (the signal) based on the output of the first processor 61.

As in a radiation detector 110b shown in FIG. 1C, the radiation detector according to the embodiment may further include a housing 65. For example, at least a portion of the metal member 10 is not covered with the housing 65. For example, the metal member 10 includes a region between the first portion 10a and the second portion 10b. At least a portion of this region is not covered with the housing 65. Thereby, the α-rays can be incident on the at least a portion of the metal member 10. The absorptance of the α-rays is high in many substances. Therefore, for example, the α-rays are substantially blocked even by paper having a thickness of 100 μm. At least a portion of the metal member 10 is not covered with the housing 65; thereby, the α-rays can be incident on the metal member 10. For example, an opening 66 (a window) is provided in the housing 65. The metal member 10 is exposed at the opening 66. The housing 65 is applicable to any radiation detector described below.

It was found that an electrical signal that corresponds to the α-rays is obtained from the first charge-sensitive amplifier 51 when the α-rays are incident on the metal member 10 in the state in which the bias voltage is applied to the metal member 10.

It is considered that this phenomenon is as follows. It is considered that a charge is generated in the metal member 10 when the α-rays are incident on the metal member 10. It is considered that the generated charge moves toward the first charge-sensitive amplifier 51 due to the bias voltage. The first charge-sensitive amplifier 51 amplifies the charge generated by the metal member 10. For example, the first charge-sensitive amplifier 51 outputs a signal corresponding to the α-rays incident on the metal member 10. For example, the charge is at least one of electrons or holes. It is considered that the holes move toward the first charge-sensitive amplifier 51 when a bias voltage that is negative with respect to the first potential 25 is applied. It is considered that the electrons move toward the first charge-sensitive amplifier 51 when a positive bias voltage is applied.

The inventor of the application discovered by experiments that such a phenomenon occurs. The experiments will now be described. In the experiments, a charge-sensitive amplifier is connected to one end of a metal wire (corresponding to the metal member 10). A first terminal of a capacitor is connected to the other end of the metal wire. A second terminal of the capacitor is set to a ground potential. A bias voltage is applied to the one end of the metal wire. Radiation is incident on the metal wire in this state. In the experiment, a mantle that includes thorium is used as the radiation source. The metal wire includes Sn.

The inventor of the application noticed that a difference of the output from the charge-sensitive amplifier occurred between when paper was placed on the metal wire and when paper was not placed. An example of the signals obtained in these states will now be described.

FIG. 2A to FIG. 2C and FIG. 3A to FIG. 3C are graphs illustrating experimental results relating to the radiation detector.

Figure 2A:
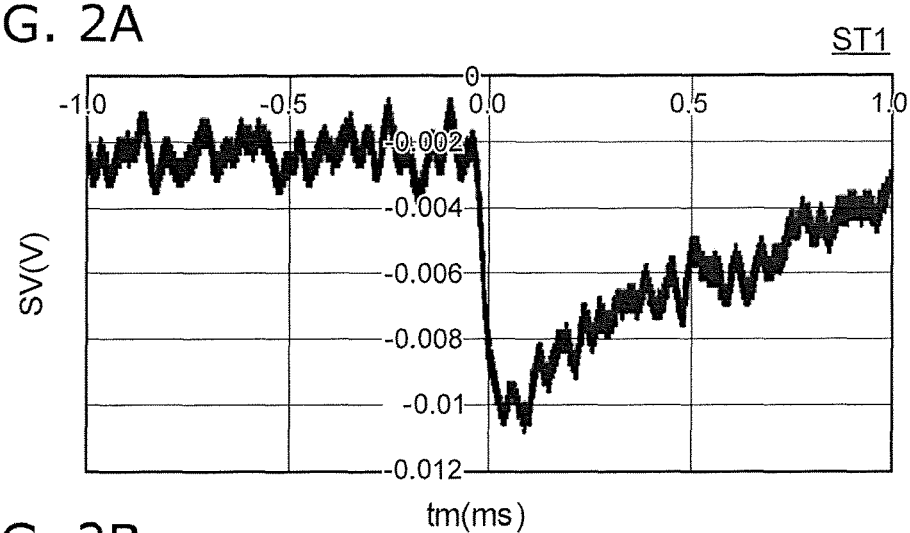
FIG. 2A to FIG. 2C are graphs illustrating experimental results relating to the radiation detector.
Figure 2B:
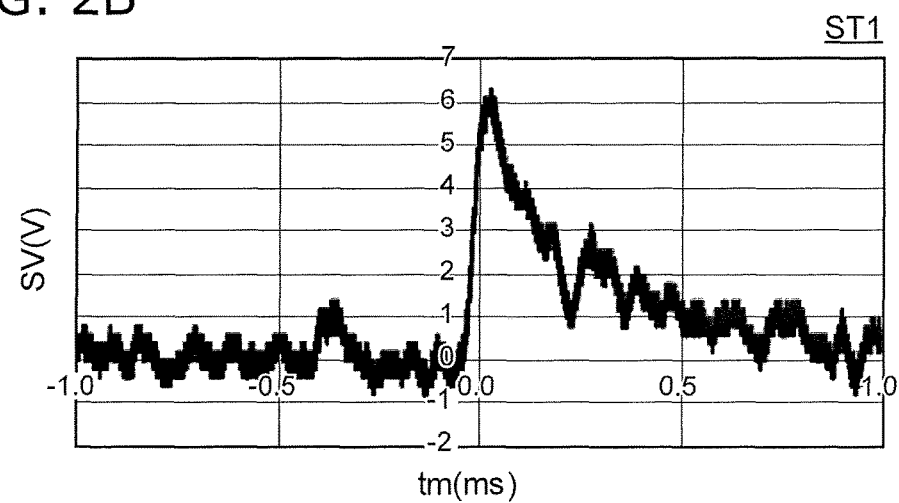
Figure 2C:
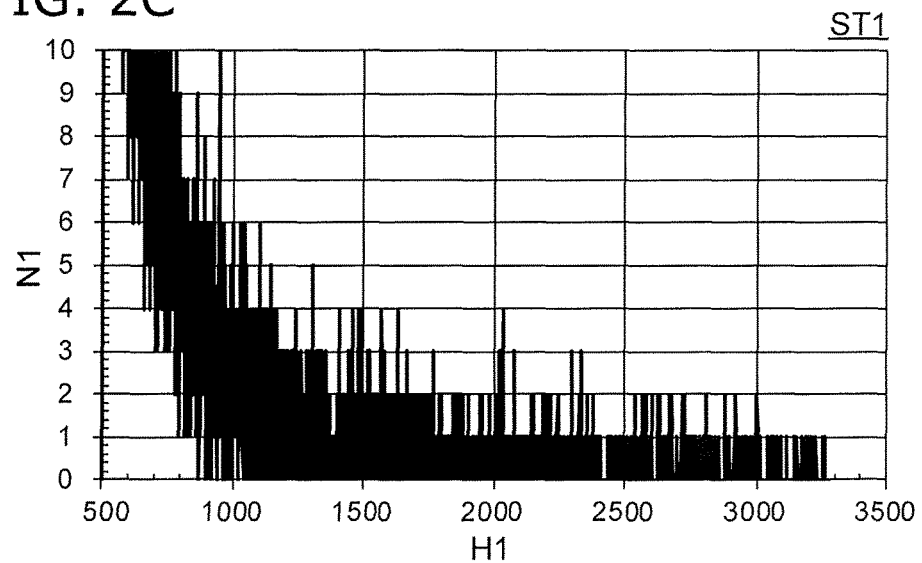
Figure 3A:
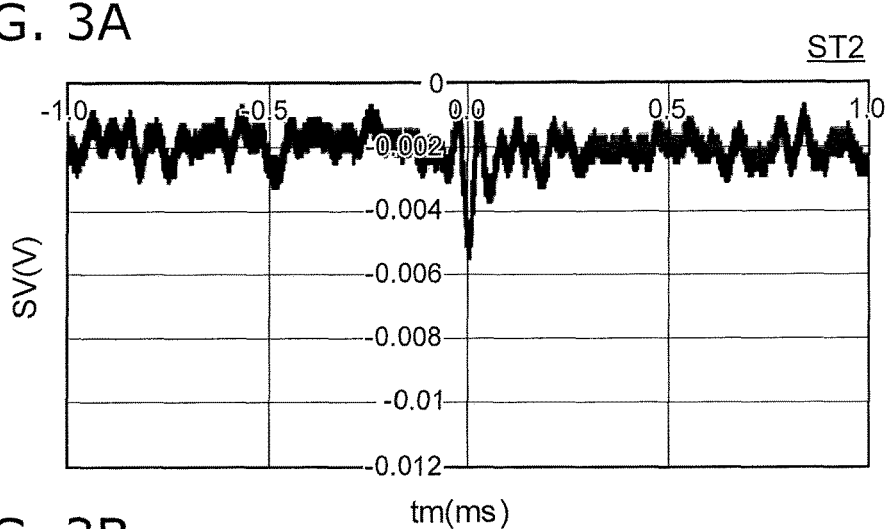
FIG. 3A to FIG. 3C are graphs illustrating experimental results relating to the radiation detector.
Figure 3B:
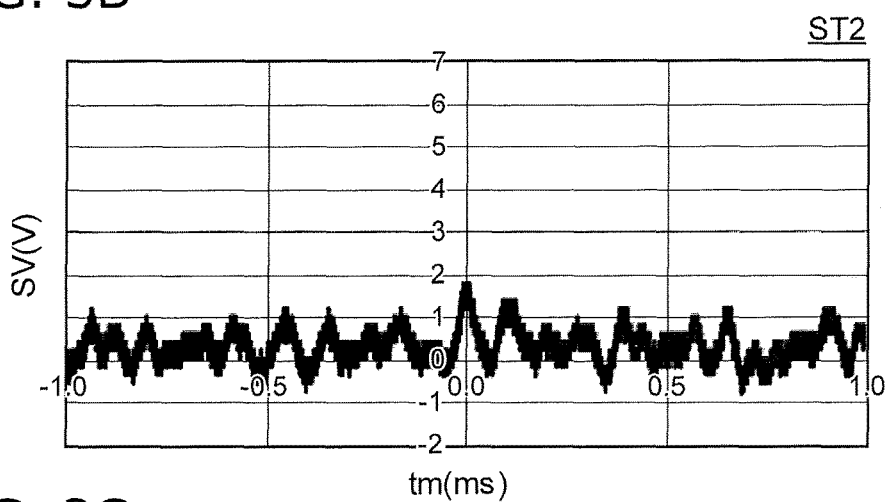
Figure 3C:
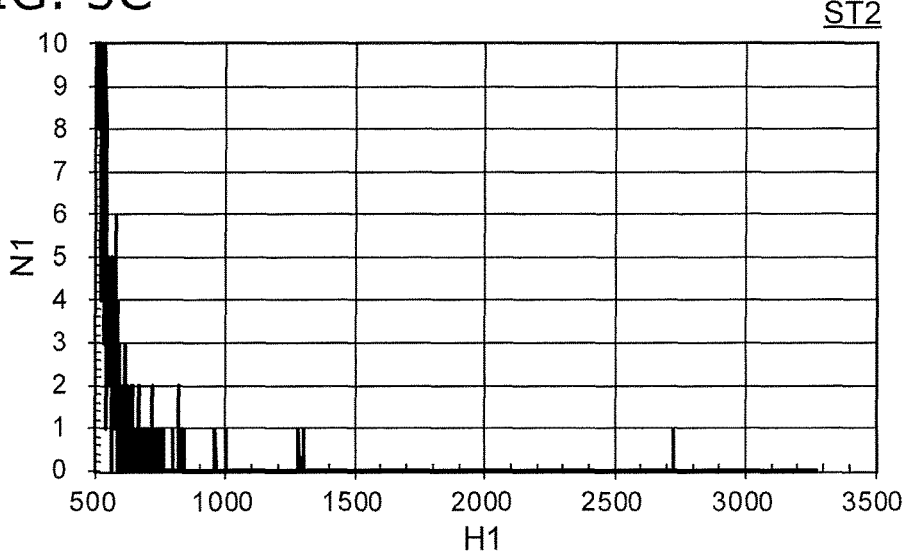

FIG. 2A to FIG. 2C correspond to a first state ST1. In the first state ST1, the paper is not placed on the metal wire. FIG. 3A to FIG. 3C correspond to a second state ST2. In the second state ST2, the paper is placed on the metal wire. The thickness of the paper is about 200 μm. In the first state ST1, α-rays, β-rays, and γ-rays are incident on the metal wire. In the second state ST2, β-rays and γ-rays are incident on the metal wire; and α-rays substantially are not incident.

In FIG. 2A and FIG. 3A, the output signal of the charge-sensitive amplifier is filtered; and the high frequency noise components are removed. FIG. 2B and FIG. 3B are signals in which the output signal of the charge-sensitive amplifier is polarity-inverted/filtered/amplified by a waveform shaping amplifier (a spectroscopy amplifier). In these figures, the horizontal axis is a time tm. The vertical axis is a signal voltage SV. FIG. 2A and FIG. 2B illustrate the state of one pulse of one incidence among multiple incidence of the radiation in the first state ST1. FIG. 3A and FIG. 3B illustrate multiple signals in the second state ST2.

As described above, the α-rays are substantially not incident on the metal wire in the second state ST2. Accordingly, it is considered that the signals shown in FIG. 3A and FIG. 3B originate from noise, β-rays, or γ-rays. As shown in FIG. 3A and FIG. 3B, peaks substantially are not observed in the second state ST2. On the other hand, as shown in FIG. 2A and FIG. 2B, it was found that a broad peak having a long duration is observed in the first state ST1. It is considered that the broad peak originates from the α-rays.

Thus, it was found that a unique signal that originates from the α-rays is obtained when the α-rays are incident on the metal wire. It was found that the α-rays can be selectively detected with low (substantially zero) sensitivity with respect to β-rays and γ-rays.

Peaks such as those recited above are obtained using multiple incidence of the radiation.

FIG. 2C and FIG. 3C illustrate the result of counting the peaks corresponding to multiple incidence of the radiation. In these figures, the horizontal axis is a height H1 of the peak (the intensity of the peak). In these figures, the vertical axis is a number N1 (the count) of peaks having the height H1. In the example, the peaks that were obtained in an interval of 5 minutes were counted.

As shown in FIG. 2C and FIG. 3C, the number N1 of the peaks is high in the region where the height H1 is 800 or less. It is considered that the peaks in this region include a noise component. For example, a height H1 of 900 is used as a threshold. The noise can be removed practically by counting the number N1 of the peaks in the region where the height H1 is 900 or more. In the region where the height H1 is 900 or more, the peak count N1 in the first state ST1 shown in FIG. 2C is clearly larger than the peak count N1 in the second state ST2 shown in FIG. 3C. It is considered that the peaks of 900 or more illustrated in FIG. 2C originate from the α-rays. For example, it is considered that the difference between the number N1 of the peaks in the first state ST1 and the number N1 of the peaks in the second state ST2 has a relationship with the amount of the α-rays.

The configuration of the radiation detector 110 according to the embodiment can be derived from such an experimental result. According to the radiation detector 110, the α-rays can be detected efficiently. For example, the α-rays can be separated from other radiation (β-rays, γ-rays, etc.) and detected. For example, the α-rays can be detected selectively with a high detection sensitivity in various environments where other radiation exists.

For example, a method may be considered as a first reference example for detecting α-rays in which the α-rays are incident on a scintillator; and photoelectric conversion of the light obtained by the scintillator is performed. In the reference example, the α-rays are converted into light; and the light is converted into a current by a photomultiplier tube. The efficiency is low because two conversions are performed. On the other hand, for example, a second reference example may be considered in which a direct conversion radiation detector has a structure in which a semiconductor material is provided between two electrodes. In the second reference example, the charge that is generated by the semiconductor material due to the incidence of the radiation is extracted. In the second reference example, the detection sensitivity is insufficient because the electrodes attenuate the α-rays. In the second reference example, the semiconductor material converts β-rays or γ-rays into a charge; and the charge is detected. Therefore, in the second reference example, the α-rays cannot be selectively detected.

Conversely, in the embodiment, a charge is extracted directly from the metal member 10 on which the α-rays are incident. Therefore, a high efficiency and a high selectivity are obtained. In the embodiment, the α-rays are incident on the metal member 10 without going through another member. Therefore, the α-rays are incident on the metal member 10 without being attenuated. Thereby, a high detection sensitivity is obtained.

In a third reference example, a charge generator that uses a semiconductor such as CdTe or the like is used as an X-ray detector for medical care (or for inspection), etc. In the third reference example, the object is inspected by irradiating, on the object, X-rays that are emitted intentionally. Accordingly, the timing of the irradiation of the X-rays to be detected is known; and the irradiation can have a sufficient intensity. Accordingly, the desired results are obtained.

Conversely, for example, in the case where contamination due to a radioactive substance is detected, the radiation of the detection object is emitted discontinuously and randomly. The timing at which the radiation is generated is unknown. Such a special circumstance exists. Therefore, it is necessary for the radiation detector to respond quickly to the radiation. It is necessary for the radiation detector to be able to detect faint radiation (having a low incidence frequency of radiation particles). It is necessary to respond with high sensitivity to radiation having a short pulse form.

In the embodiment, the radiation 81 (e.g., the α-rays) can be detected with high sensitivity. In the embodiment, the α-rays can be selectively detected.

In the embodiment, the metal member 10 includes, for example, at least one selected from the group consisting of Cu, Sn, Zn, Al, and Pb. The phenomenon recited above occurs for at least these materials.

The capacitance of the capacitor 20 is, for example, not less than 0.1 pF and not more than 1 nF.

In the embodiment, the first charge-sensitive amplifier 51 amplifies the pulse signal generated by the radiation 81 being incident on the metal member 10. The number of signals and the intensity (the peak value) of the signals obtained by the first charge-sensitive amplifier 51 are measured by the first processor 61.

As described above, the radiation detector 110 may further include the first potential setter 71 and the first processor 61. The first potential setter 71 is electrically connected to the first portion 10a of the metal member 10. The first processor 61 is electrically connected to the first charge-sensitive amplifier 51.

For example, in the first processor 61, the peak value of the pulse and the number of pulses may be measured by, for example, shaping the waveform using a waveform shaping amplifier (a spectroscopy amplifier) and by using a pulse height analyzer (a multichannel analyzer). Or, in the first processor 61, the waveform may be shaped by a waveform shaping amplifier; a signal that is a preset threshold or more may be extracted by a comparator; and the number of signals may be measured by a counter circuit.

For example, the waveform shaping amplifier separates, from the noise component, the signal having the pulse form output from the first charge-sensitive amplifier 51. For example, the waveform shaping amplifier amplifies the signal to match the input/output range of the pulse height analyzer. For example, the signal that originates in the radiation detection has a frequency of 1 kHz to 20 kHz. For example, the noise component is separated into a noise component having a frequency less than 1 kHz and a noise component having a frequency exceeding 20 kHz. For example, the separation is performed by a filter circuit built into the waveform shaping amplifier. The separation may be performed by a filter circuit provided separately. Thereby, the noise component that is included in the signal is reduced. In the first charge-sensitive amplifier 51 and the first processor 61, the counting is performed by a pulse method. Examples of the waveform amplifier are described below.

Figure 4A:
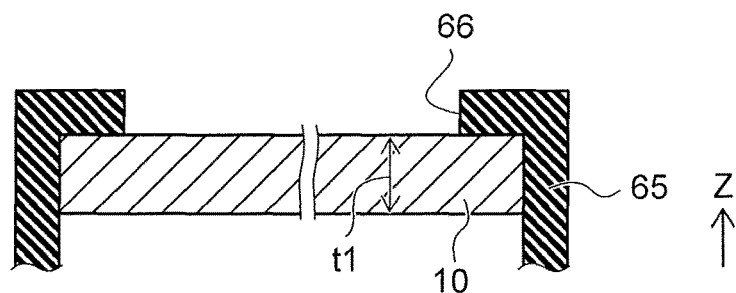
FIG. 4A and FIG. 4B are schematic cross-sectional views illustrating portions of the radiation detector according to the first embodiment.
Figure 4B:
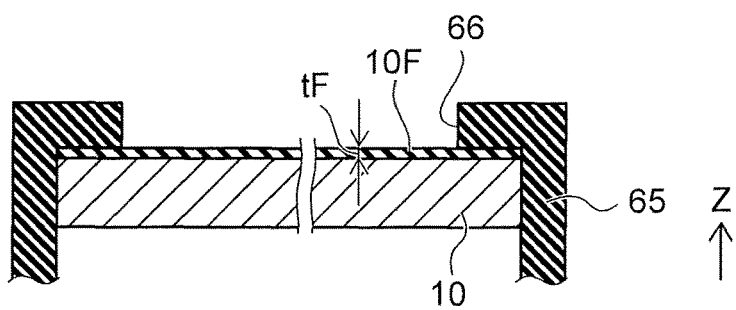

FIG. 4A and FIG. 4B are schematic cross-sectional views illustrating portions of the radiation detector according to the first embodiment.

As shown in FIG. 4A, a portion of the metal member 10 is exposed at the opening 66 of the housing 65. A thickness t1 of the metal member 10 is, for example, not less than 10 nm and not more than 3 mm. A direction perpendicular to the front surface of the metal member 10 is taken as a Z-axis direction. The thickness is the length in the Z-axis direction. A stable intensity is obtained at the metal member 10 by setting the metal member 10 to be thick. The device becomes heavier than necessary when the thickness t1 exceeds 3 mm.

In the case where the thickness t1 of the metal member 10 is 10 nm or more, for example, the α-rays that are incident on the metal member 10 are converted into charge efficiently. High sensitivity is obtained easily. As described below, a detector of other radiation (e.g., β-rays, γ-rays, etc.) may be provided under the metal member 10. In such a case, if the thickness t1 of the metal member 10 is excessively thick, the other radiation is attenuated greatly by the metal member 10. For example, even in the case where a detector of other radiation (e.g., β-rays, γ-rays, etc.) is provided under the metal member 10, the other radiation can be detected efficiently by setting the thickness t1 to be 50 μm or less.

As shown in FIG. 4B, a thin film 10F may be provided at the front surface of the metal member 10. For example, the film 10F includes an oxide of a metal included in the metal member 10. A thickness tF of the film 10F is, for example, 200 nm or less. The α-rays can pass through the film 10F. The film 10F may function as a protective film of the metal member 10.

Figure 5:
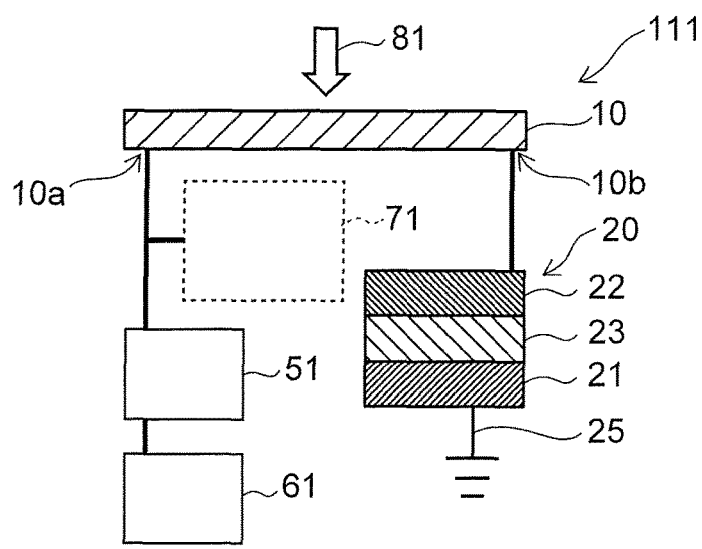
FIG. 5 is a schematic view illustrating a radiation detector according to the first embodiment.

FIG. 5 is a schematic view illustrating a radiation detector according to the first embodiment.

In the radiation detector 111 as shown in FIG. 5, the capacitor 20 includes a first conductive layer 21, a second conductive layer 22, and a semiconductor layer 23. The semiconductor layer 23 is provided between the first conductive layer 21 and the second conductive layer 22. The first conductive layer 21 is set to the first potential 25. The second conductive layer 22 is electrically connected to the second portion 10b of the metal member 10. The semiconductor layer 23 may include, for example, an organic semiconductor. For example, other radiation (e.g., β-rays, γ-rays, etc.) may be detected by the semiconductor layer 23. A portion that can detect the other radiation may be used as the capacitor 20. For example, the other radiation is detected easily with high sensitivity by the semiconductor layer 23 including the organic semiconductor.

Figure 6:
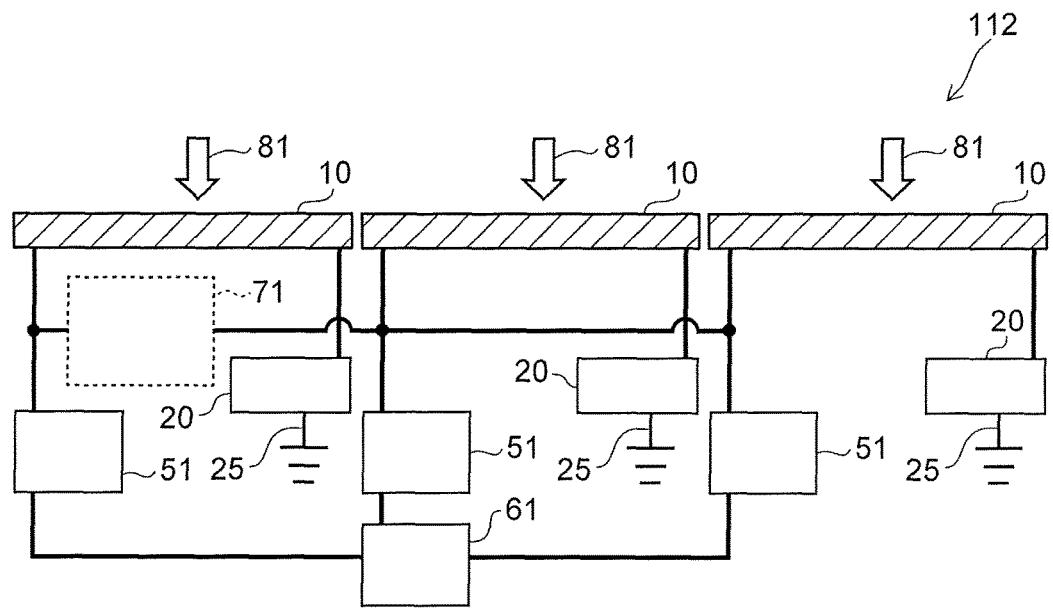
FIG. 6 is a schematic view illustrating a radiation detector according to the first embodiment.
Figure 7:
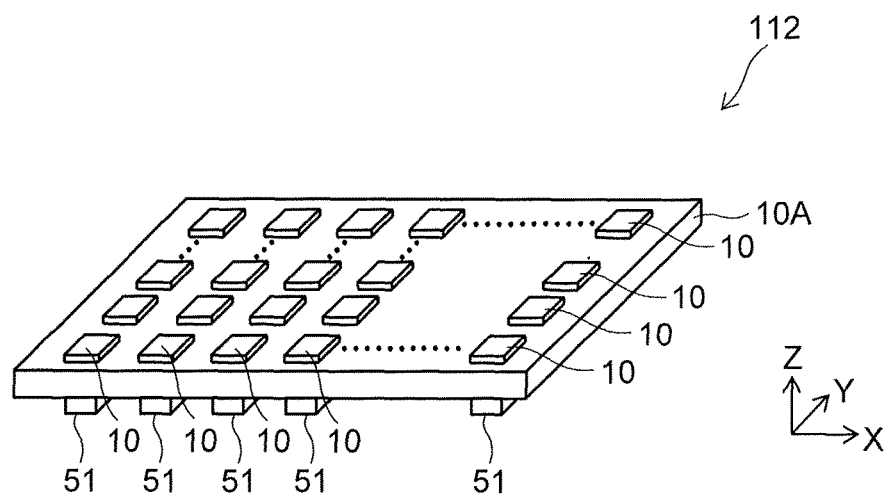
FIG. 7 is a schematic view illustrating a radiation detector according to the first embodiment.

FIG. 6 and FIG. 7 are schematic views illustrating a radiation detector according to the first embodiment.

Multiple detectors are provided in the radiation detector 112 according to the embodiment as shown in FIG. 6. The multiple detectors each include the metal member 10 and the capacitor 20. In the example, the first charge-sensitive amplifier 51 is provided in each of the multiple detectors. In the example, one first processor 61 and one first potential setter 71 are provided for the multiple detectors.

As shown in FIG. 7, the multiple metal members 10 may be provided in a matrix configuration along an X-axis direction and a Y-axis direction. The radiation can be detected efficiently by a detector having a planar configuration. For example, the position of a radioactive substance can be ascertained efficiently. In the example, the multiple metal members 10 are provided at a first surface of a substrate 10A. The multiple first charge-sensitive amplifiers 51 are provided at a second surface (e.g., the back surface) of the substrate 10A.

Second Embodiment

Figure 8:
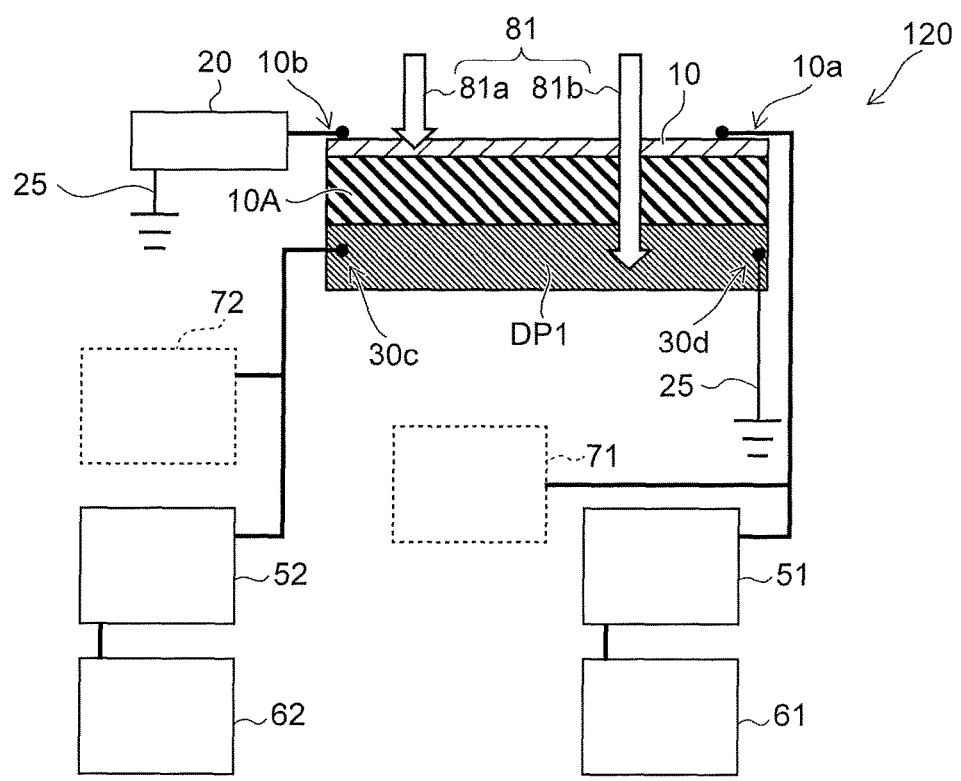
FIG. 8 is a schematic view illustrating a radiation detector according to a second embodiment.

FIG. 8 is a schematic view illustrating a radiation detector according to a second embodiment.

As shown in FIG. 8, the radiation detector 120 according to the embodiment further includes a first radiation detecting portion DP1 in addition to the metal member 10, the capacitor 20, and the first charge-sensitive amplifier 51. A second charge-sensitive amplifier 52, a second potential setter 72, and a second processor 62 are further provided in the example. Otherwise, the configuration of the radiation detector 120 is similar to the configuration of the radiation detector 110. In the radiation detector 120, the first radiation detecting portion DP1 detects radiation including at least one selected from the group consisting of β-rays and γ-rays.

In the example, the substrate 10A is provided between the metal member 10 and the first radiation detecting portion DP1. For example, the metal member 10 is provided at the first surface of the substrate 10A. The first radiation detecting portion DP1 is provided at the second surface (e.g., the back surface) of the substrate 10A.

For example, at least a portion of the metal member 10 overlaps at least a portion of the first radiation detecting portion DP1.

In the example, a portion (a third portion 30c) of the first radiation detecting portion DP1 is electrically connected to the second charge-sensitive amplifier 52 and the second potential setter 72. The output of the second charge-sensitive amplifier 52 is input to the second processor 62. On the other hand, another portion (a fourth portion 30d) of the first radiation detecting portion DP1 is set to the first potential 25.

For example, the radiation 81 is incident on the metal member 10. The radiation 81 includes first radiation 81a and second radiation 81b. The first radiation 81a is, for example, α-rays. The second radiation 81b includes at least one selected from the group consisting of β-rays and γ-rays.

The first radiation 81a is incident on the metal member 10 and substantially is not incident on the substrate 10A and the first radiation detecting portion DP1.

On the other hand, the radiation (the second radiation 81b) that includes at least one selected from the group consisting of β-rays and γ-rays passes through at least a portion of the metal member 10 and is incident on the first radiation detecting portion DP1. For example, the second radiation 81b passes through the metal member 10 and the substrate 10A and is incident on the first radiation detecting portion DP1. The signal that is obtained by the first radiation detecting portion DP1 is detected by the second charge-sensitive amplifier 52; and the result is processed by the second processor 62. The second processor 62 outputs the detection result of the second radiation 81b (at least one selected from the group consisting of β-rays and γ-rays).

On the other hand, the first processor 61 outputs the detection result (the detection result of the α-rays) based on the signal obtained by the metal member 10.

In the example, it is favorable for the thickness t1 of the metal member 10 to be not less than 10 nm and not more than 50 μm. For example, the α-rays that are incident on the metal member 10 are converted into charge efficiently. High sensitivity is obtained easily. The second radiation 81b efficiently reaches the first radiation detecting portion DP1 when the thickness t1 is 50 μm or less. The first radiation 81a and the second radiation 81b each can be detected with high sensitivity.

Figure 9:
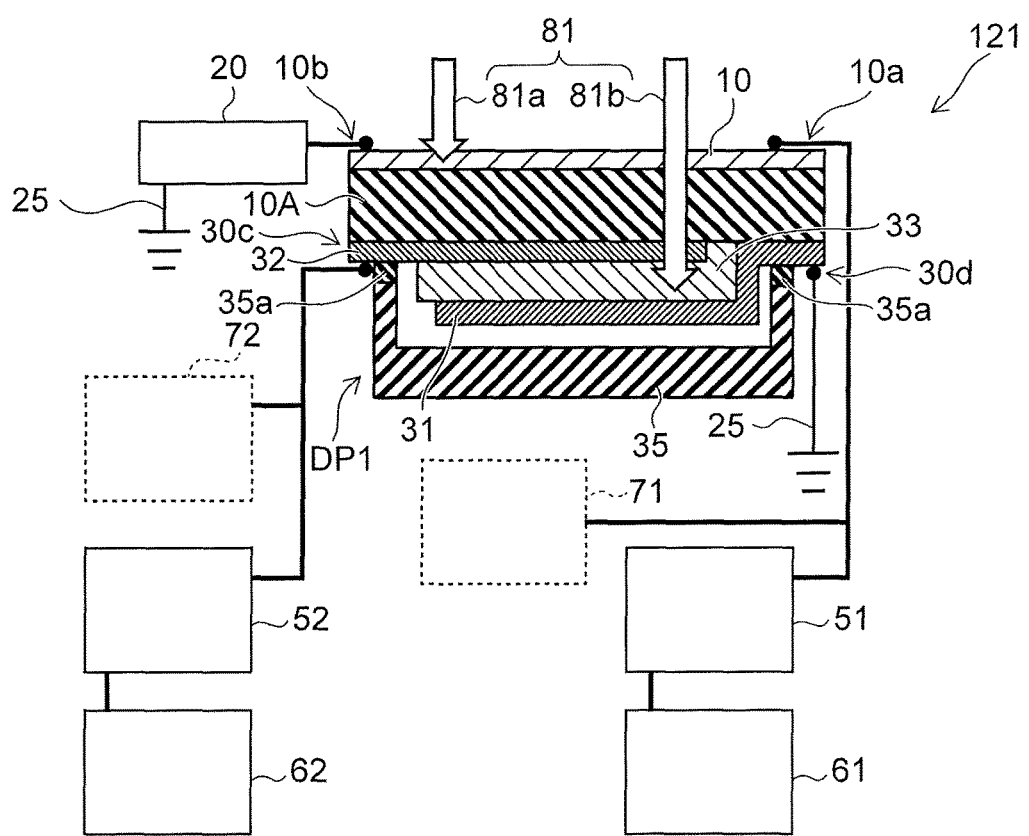
FIG. 9 is a schematic view illustrating a radiation detector according to the second embodiment.

FIG. 9 is a schematic view illustrating a radiation detector according to the second embodiment.

In the radiation detector 121 according to the embodiment as shown in FIG. 9, the first radiation detecting portion DP1 includes a first electrode 31, a second electrode 32, and a semiconductor layer 33. A sealing member 35 and a bonding member 35a are further provided in the example.

The second electrode 32 is provided between the first electrode 31 and the substrate 10A. The semiconductor layer 33 is provided between the first electrode 31 and the second electrode 32. The semiconductor layer 33 includes, for example, an organic semiconductor. The semiconductor layer 33 is covered with the sealing member 35, the substrate 10A, and the bonding member 35a. For example, degradation due to moisture or oxygen in air is suppressed by the organic semiconductor included in the semiconductor layer 33. A portion of the first electrode 31 is not covered with the sealing member 35. This portion is set to the first potential 25. A portion of the second electrode 32 is not covered with the sealing member 35. This portion is electrically connected to the second charge-sensitive amplifier 52. The second radiation 81b that is incident on the semiconductor layer 33 is converted into charge. A detection result that corresponds to the charge is obtained by the second charge-sensitive amplifier 52 and the second processor 62.

Figure 10:
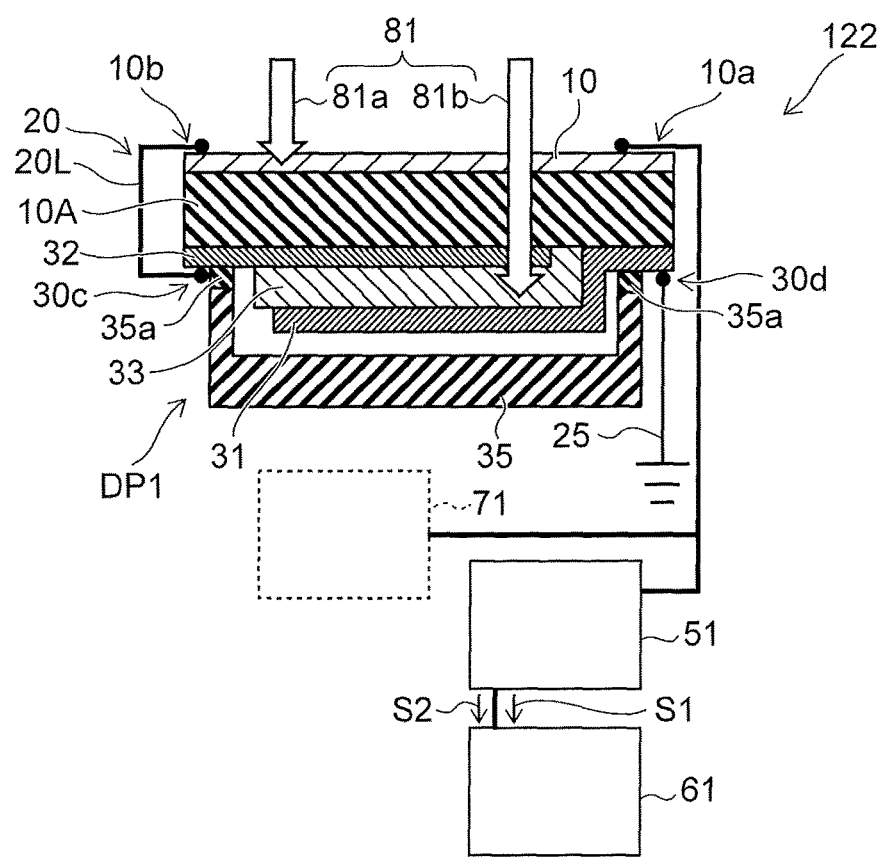
FIG. 10 is a schematic view illustrating a radiation detector according to the second embodiment.

FIG. 10 is a schematic view illustrating a radiation detector according to the second embodiment.

In the radiation detector 122 according to the embodiment as shown in FIG. 10 as well, the first radiation detecting portion DP1 includes the first electrode 31, the second electrode 32, and the semiconductor layer 33. The sealing member 35 and the bonding member 35a are further provided in the example. The capacitor 20 (e.g., referring to FIG. 9) is not provided in the radiation detector 122. Also, the second charge-sensitive amplifier 52, the second potential setter 72, and the second processor 62 are not provided.

Thus, the metal member 10, the first radiation detecting portion DP1, and the first charge-sensitive amplifier 51 are provided in the radiation detector 122. The first radiation detecting portion DP1 detects the radiation (the second radiation 81b) including at least one selected from the group consisting of β-rays and γ-rays. The portion (the third portion 30c) of the first radiation detecting portion DP1 is electrically connected to the second portion 10b of the metal member 10. For example, the third portion 30c and the second portion 10b are electrically connected to each other by a connection member 20L.

In the radiation detector 122, at least a portion of the first radiation detecting portion DP1 functions as the capacitor 20 (e.g., referring to FIG. 9) electrically connected to the second portion 10b of the metal member 10. The first charge-sensitive amplifier 51 is electrically connected to the first portion 10a of the metal member 10. The first charge-sensitive amplifier 51 outputs a first signal S1 corresponding to the α-rays (the first radiation 81a) incident on the metal member 10.

For example, the first charge-sensitive amplifier 51 outputs a second signal S2 corresponding to the output of the first radiation detecting portion DP1.

In the radiation detector 122, the first charge-sensitive amplifier 51 is used both for the detection of the first radiation 81a and for the detection of the second radiation 81b.

The first processor 61 is electrically connected to the first charge-sensitive amplifier 51. For example, the first charge-sensitive amplifier 51 is electrically connected to the first radiation detecting portion DP1. In the example, the first charge-sensitive amplifier 51 is electrically connected to the first radiation detecting portion DP1 via the metal member 10 and the connection member 20L.

As described below, the pulse shape that is obtained is different between the α-rays and the other radiation (the β-rays and the γ-rays). These radiation may be detected by separating based on the pulse shapes. For example, the separation may be performed by the first processor 61. The first processor 61 may separate the detection result of the first radiation 81a (the α-rays) and the detection result of the second radiation 81b (the radiation including at least one of the β-rays or the γ-rays) by using at least one of the shape of the waveform of the output or the magnitude of the output from the first charge-sensitive amplifier 51.

Figure 11:
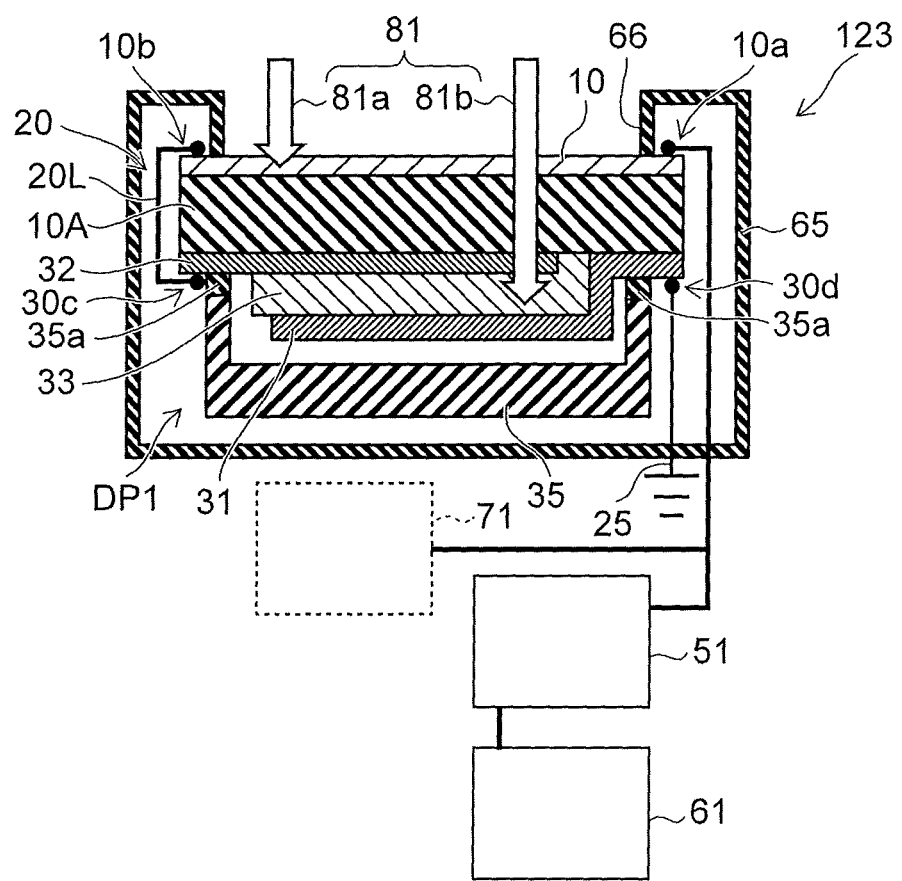
FIG. 11 is a schematic view illustrating a radiation detector according to the second embodiment.

FIG. 11 is a schematic view illustrating a radiation detector according to the second embodiment.

As shown in FIG. 11, the housing 65 is further provided in the radiation detector 123 according to the embodiment. Otherwise, the configuration of the radiation detector 123 is, for example, similar to the configuration of the radiation detector 122.

In the radiation detector 123 as well, at least a portion of the metal member 10 is exposed at the opening 66 of the housing 65. In the example, the first radiation detecting portion DP1 also is provided inside the housing 65. At least one of the first charge-sensitive amplifier 51, the first processor 61, or the first potential setter 71 may be provided inside the housing 65.

In the radiation detector 123, the metal member 10 may attenuate the light incident on the first radiation detecting portion DP1. For example, the metal member 10 may function as a light attenuation film (a light-shielding film). For example, the incidence of external light on the semiconductor layer 33 of the first radiation detecting portion DP1 is suppressed. For example, the noise can be reduced.

Figure 12:
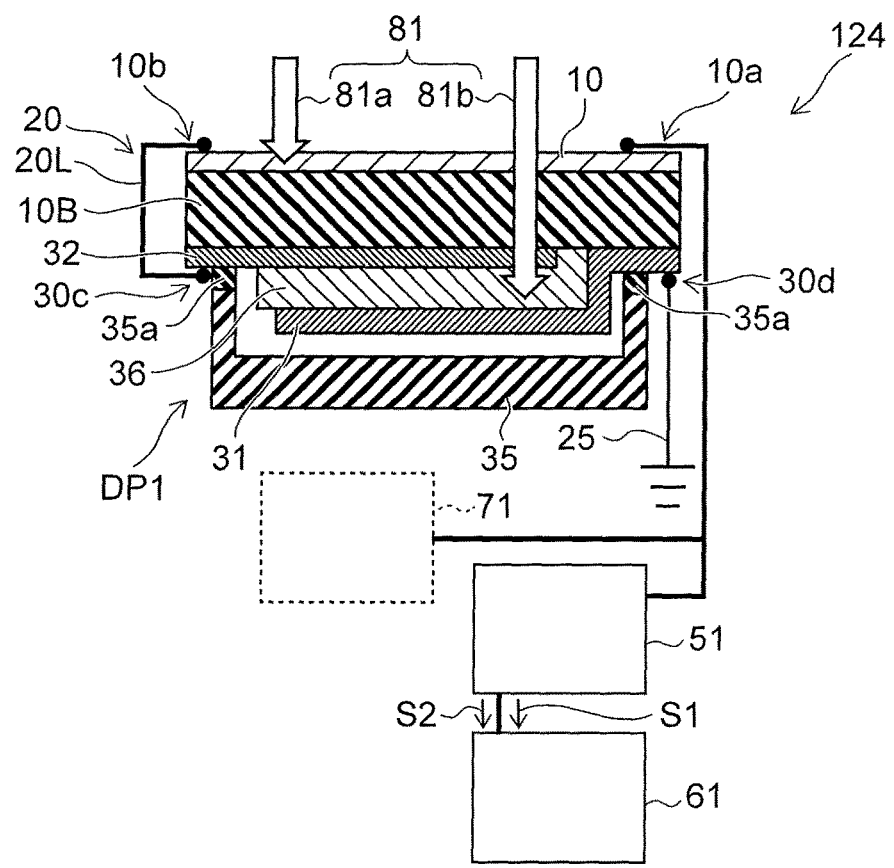
FIG. 12 is a schematic view illustrating a radiation detector according to the second embodiment.

FIG. 12 is a schematic view illustrating a radiation detector according to the second embodiment.

In the radiation detector 124 according to the embodiment as shown in FIG. 12, the first radiation detecting portion DP1 includes the first electrode 31, the second electrode 32, and a photoelectric conversion layer 36. A scintillator 10B also is provided. Other than the scintillator 10B that is provided instead of the substrate 10A, the configuration of the radiation detector 124 is similar to the configuration of the radiation detector 122.

For example, light is generated by the scintillator 10B when the radiation 81 is incident. The metal member 10 may have a high reflectance for the wavelength of the generated light. The light that is generated by the scintillator 10B can be introduced efficiently to the photoelectric conversion layer 36.

Figure 13:
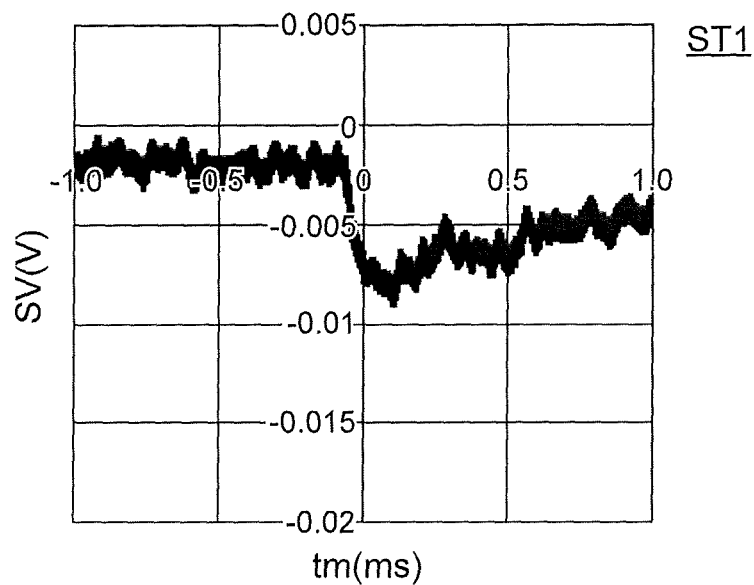
FIG. 13 is a graph illustrating an experimental result relating to the radiation detector.
Figure 14:
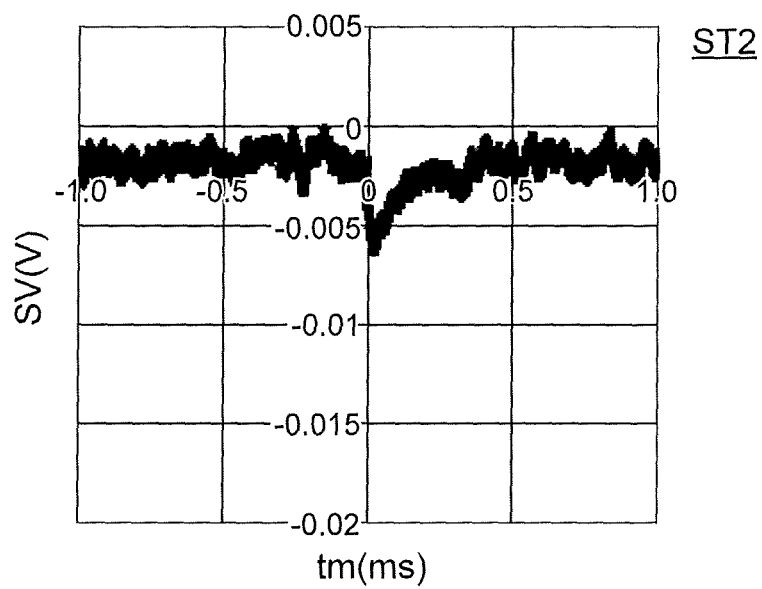
FIG. 14 is a graph illustrating an experimental result relating to the radiation detector.

FIG. 13 and FIG. 14 are graphs illustrating an experimental result relating to the radiation detector.

These figures show measurement results in the first state ST1 and the second state ST2 of the radiation detector 124 illustrated in FIG. 12.

FIG. 13 corresponds to the first state ST1. In the first state ST1, paper is not placed on the metal member 10. FIG. 14 corresponds to the second state ST2. In the second state ST2, paper is placed on the metal member 10. The thickness of the paper is about 200 μm. In the first state ST1, α-rays, β-rays, and γ-rays are incident on the metal member 10. In the second state ST2, β-rays and γ-rays are incident but α-rays substantially are not incident on the metal member 10.

In the second state ST2, the α-rays substantially are not incident on the metal member 10. Accordingly, it is considered that the signal shown in FIG. 14 originates from the β-rays or the γ-rays. As shown in FIG. 14, a peak that has a short duration is observed in the second state ST2. On the other hand, as shown in FIG. 13, a broad peak that has a long duration is observed in the first state ST1. It is considered that the broad peak originates from the α-rays.

It can be seen by comparing FIG. 13 and FIG. 14 that the obtained pulse shapes are different between the α-rays and the other radiation (the β-rays and the γ-rays). These radiation may be separated and detected based on the difference of the pulse shapes. For example, the separation may be performed by the first processor 61. The first processor 61 may separate the detection result of the first radiation 81a (the α-rays) and the detection result of the second radiation 81b (the radiation including at least one of the β-rays or the γ-rays) by using at least one of the shape of the waveform of the output or the magnitude of the output from the first charge-sensitive amplifier 51.

Thus, according to the radiation detector 124, the α-rays can be detected efficiently. The α-rays and the other radiation (the β-rays, the γ-rays, etc.) can be separated and detected.

In the radiation detector 124, the metal member 10 may attenuate the light incident on the first radiation detecting portion DP1. For example, the incidence on the scintillator 10B and the photoelectric conversion layer 36 of external light is suppressed. For example, the noise can be reduced.

Figure 15:
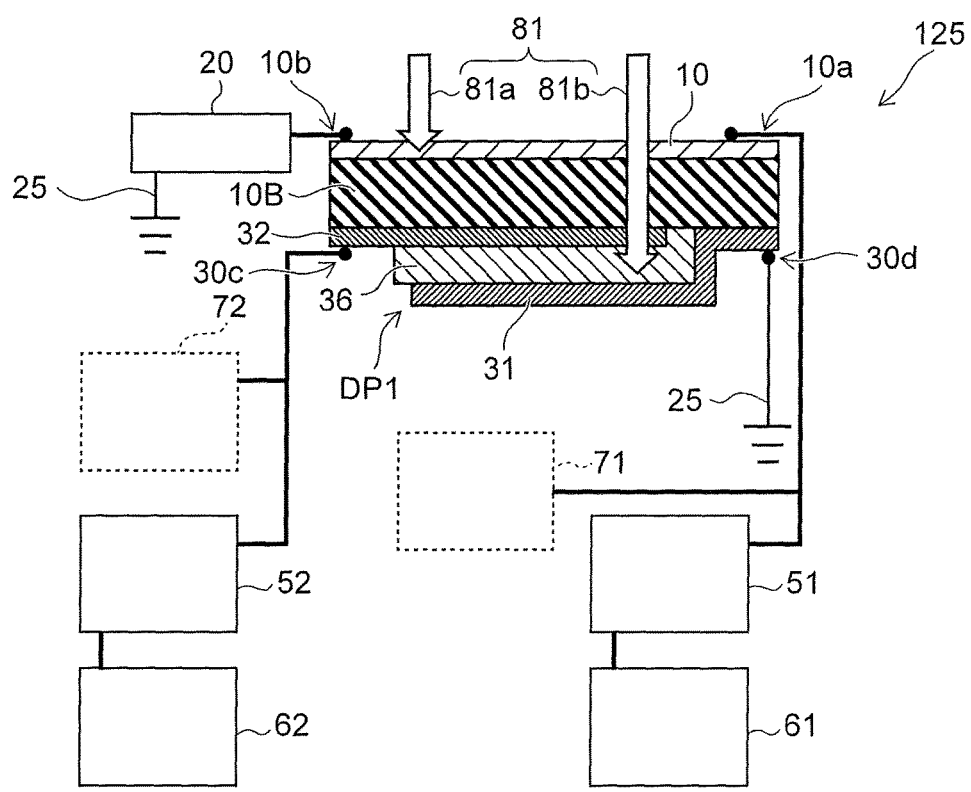
FIG. 15 is a schematic view illustrating a radiation detector according to the second embodiment.

FIG. 15 is a schematic view illustrating a radiation detector according to the second embodiment.

In the radiation detector 125 according to the embodiment as shown in FIG. 15, the first radiation detecting portion DP1 includes the first electrode 31, the second electrode 32, and the photoelectric conversion layer 36. The scintillator 10B also is provided.

The scintillator 10B is provided between the metal member 10 and the first electrode 31. The second electrode 32 is provided between the scintillator 10B and the first electrode 31. The photoelectric conversion layer 36 is provided between the second electrode 32 and the first electrode 31. For example, the photoelectric conversion layer 36 includes an organic semiconductor or a silicon semiconductor. For example, the second electrode 32, the first electrode 31, and the photoelectric conversion layer 36 are at least a portion of a photodiode.

For example, the first radiation 81a (e.g., the α-rays) is incident on the metal member 10; and the result of the first radiation 81a is obtained by the first charge-sensitive amplifier 51 and the first processor 61.

For example, the second radiation 81b (e.g., at least one selected from the group consisting of β-rays and γ-rays) passes through the metal member 10 and is incident on the scintillator 10B. A portion of the second radiation 81b is converted into light by the scintillator 10B. The light is incident on the photoelectric conversion layer 36. The light is converted into an electrical signal. A portion of the second radiation 81b may be incident on the photoelectric conversion layer 36. The second radiation 81b may be converted into an electrical signal by the photoelectric conversion layer 36.

In the example, the portion (the third portion 30c) of the first radiation detecting portion DP1 is connected to the second potential setter 72 and the second charge-sensitive amplifier 52. The output of the second charge-sensitive amplifier 52 is input to the second processor 62. The result that is detected by the first radiation detecting portion DP1 is output by the second charge-sensitive amplifier 52 and the second processor 62. The detection result corresponds to the second radiation 81b.

Thus, the second charge-sensitive amplifier 52 is provided in the radiation detector 125. The second charge-sensitive amplifier 52 is electrically connected to a portion (in the example, the third portion 30c) of the first radiation detecting portion DP1. The second charge-sensitive amplifier 52 outputs a signal corresponding to the incidence of the second radiation 81b.

Figure 16:
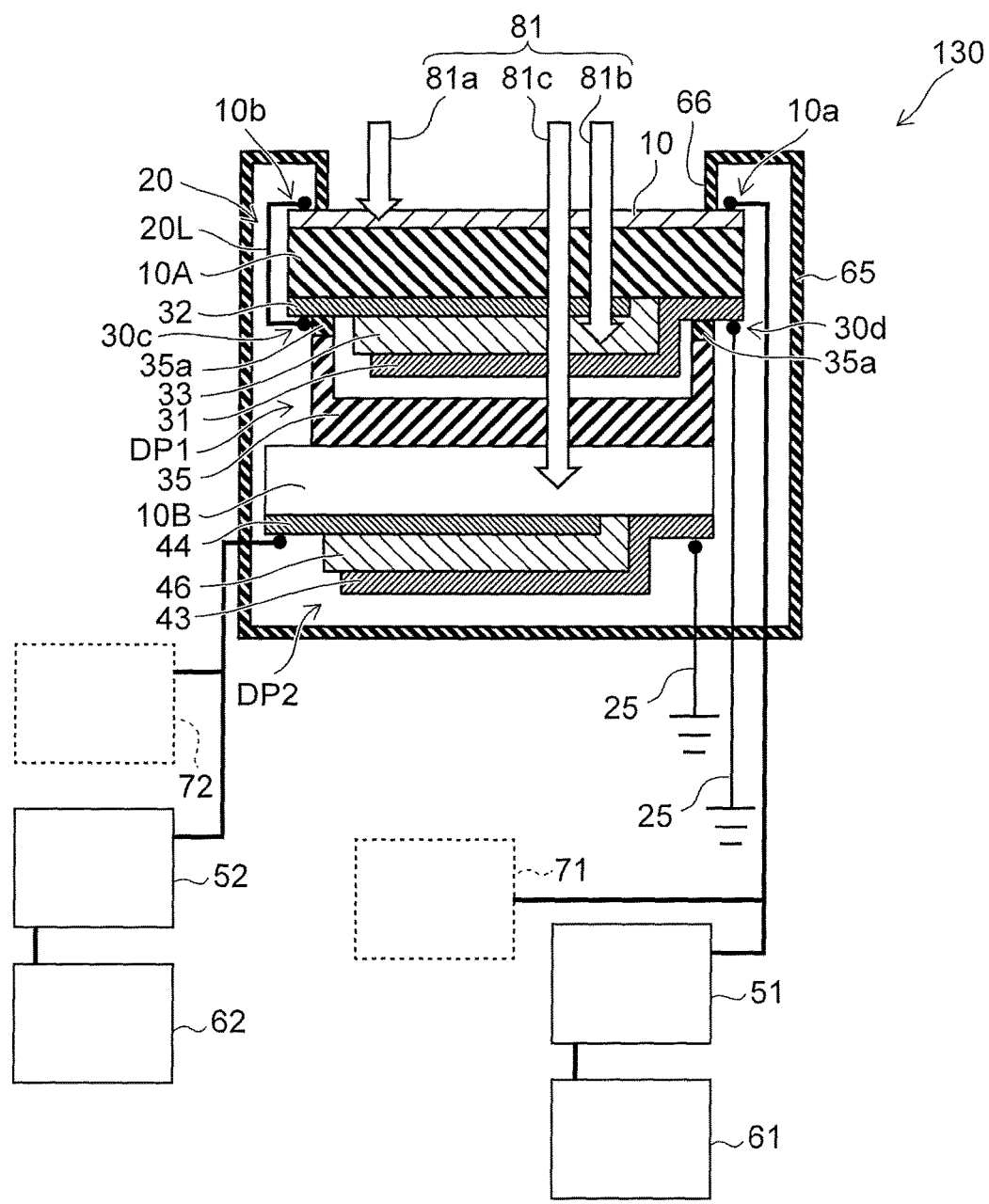
FIG. 16 is a schematic view illustrating a radiation detector according to the second embodiment.

FIG. 16 is a schematic view illustrating a radiation detector according to the second embodiment.

In the radiation detector 130 according to the embodiment as shown in FIG. 16, a second radiation detecting portion DP2 is provided in addition to the metal member 10 and the first radiation detecting portion DP1. The first radiation detecting portion DP1 is provided between the metal member 10 and the second radiation detecting portion DP2.

In the example, the substrate 10A is provided between the first radiation detecting portion DP1 and the metal member 10. The scintillator 10B is provided between the second radiation detecting portion DP2 and the first radiation detecting portion DP1.

In the example as well, the first radiation detecting portion DP1 includes the first electrode 31, the second electrode 32, and the semiconductor layer 33. The second radiation detecting portion DP2 includes a third electrode 43, a fourth electrode 44, and a photoelectric conversion layer 46. The fourth electrode 44 is provided between the third electrode 43 and the scintillator 10B. The photoelectric conversion layer 46 is provided between the third electrode 43 and the fourth electrode 44. For example, the photoelectric conversion layer 46 includes a silicon semiconductor. For example, the third electrode 43, the fourth electrode 44, and the photoelectric conversion layer 46 are included in at least a portion of a PIN photodiode.

In the example, the second charge-sensitive amplifier 52 and the second potential setter 72 are electrically connected to the fourth electrode 44. The output of the second charge-sensitive amplifier 52 is input to the second processor 62. The third electrode 43 is set to the first potential 25.

The first radiation 81a (e.g., the α-rays) is incident on the metal member 10; and the detection result of the first radiation 81a is obtained by the first charge-sensitive amplifier 51 and the first processor 61. The first radiation 81a substantially is not incident on the first radiation detecting portion DP1 and the second radiation detecting portion DP2.

The second radiation 81b includes, for example, β-rays. At least a portion of the second radiation 81b passes through the metal member 10 and is converted into an electrical signal by the first radiation detecting portion DP1. In the example, the detection result of the second radiation 81b is obtained by the first charge-sensitive amplifier 51 and the first processor 61.

Third radiation 81c includes, for example, γ-rays. At least a portion of the third radiation 81c passes through the metal member 10 and the first radiation detecting portion DP1 and is converted into an electrical signal by the second radiation detecting portion DP2. In the example, the detection result of the third radiation 81c is obtained by the second charge-sensitive amplifier 52 and the second processor 62.

Thus, in the example, the first radiation detecting portion DP1 is provided between the metal member 10 and the second radiation detecting portion DP2. The first radiation detecting portion DP1 detects β-rays. The second radiation detecting portion DP2 detects γ-rays.

It is favorable for the thickness of the semiconductor layer 33 (e.g., the organic semiconductor layer) to be 1 mm or less. Thereby, for example, the β-rays can be detected efficiently by the semiconductor layer 33. Then, the γ-rays pass through the semiconductor layer 33 and can be incident efficiently on the second radiation detecting portion DP2.

Figure 17:
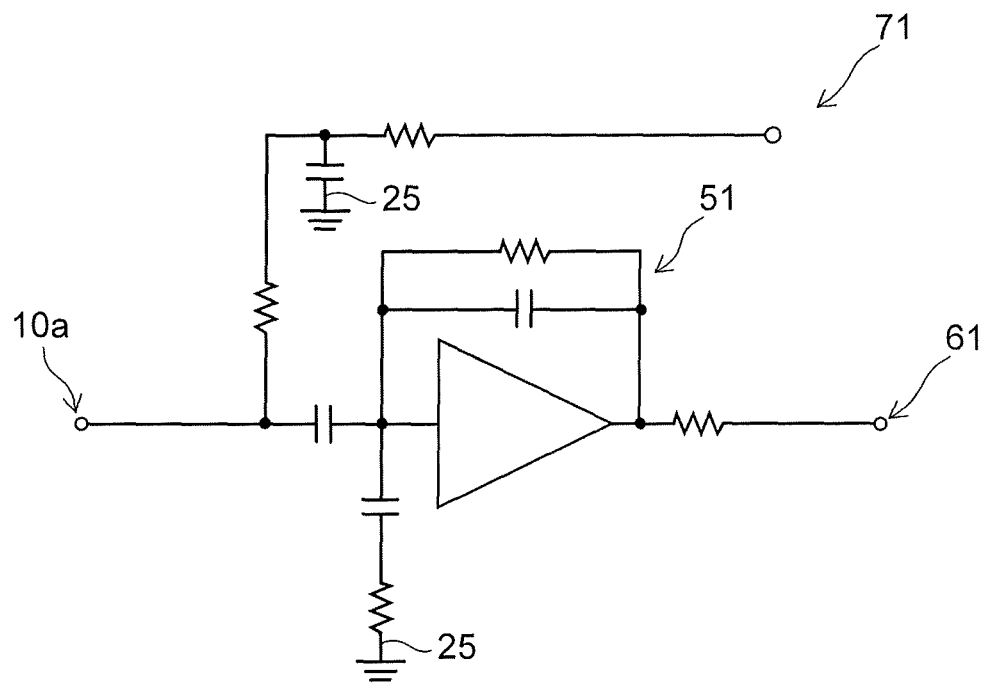
FIG. 17 is a circuit diagram illustrating a portion of the radiation detector according to the embodiment.

FIG. 17 is a circuit diagram illustrating a portion of the radiation detector according to the embodiment.

As shown in FIG. 17, the first charge-sensitive amplifier 51 includes, for example, an integration circuit.

Figure 18:
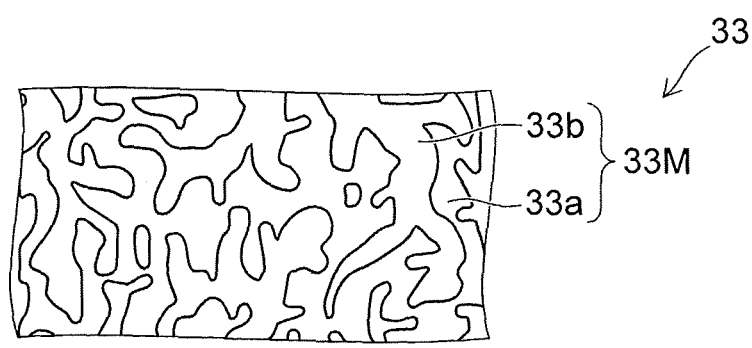
FIG. 18 is a schematic view illustrating a portion of the radiation detector according to the embodiment.

FIG. 18 is a schematic view illustrating a portion of the radiation detector according to the embodiment.

FIG. 18 illustrates the semiconductor layer 33 (referring to FIG. 9). The semiconductor layer 33 includes, for example, an organic semiconductor region 33M. The organic semiconductor region 33M includes a first compound 33a and a second compound 33b. The first compound 33a includes, for example, poly-3-hexylthiophene (P3HT). The second compound 33b includes, for example, phenyl C61 butyric acid methyl ester (PCBM). These regions are mixed. For example, the organic semiconductor region 33M has a bulk heterojunction structure. At least a portion of the organic semiconductor region 33M may be amorphous. For example, the uniformity of the organic semiconductor region 33M is high.

Figure 19:
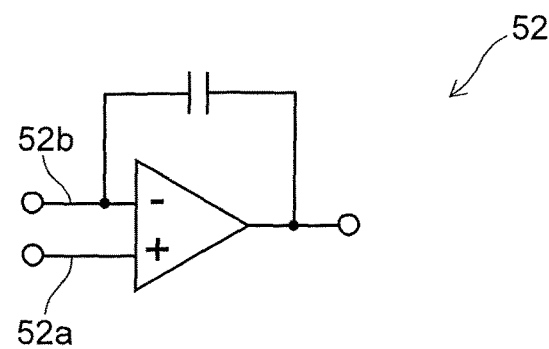
FIG. 19 is a circuit diagram illustrating a portion of the radiation detector according to the embodiment.

FIG. 19 is a circuit diagram illustrating a portion of the radiation detector according to the embodiment.

As shown in FIG. 19, the second charge-sensitive amplifier 52 may include an integration circuit. For example, one of the first electrode 31 or the second electrode 32 is electrically connected to a first input 52a of the integration circuit. For example, the other of the first electrode 31 or the second electrode 32 is electrically connected to a second input 52b of the integration circuit. For example, one of the third electrode 43 or the fourth electrode 44 is electrically connected to the first input 52a of the integration circuit. For example, the other of the third electrode 43 or the fourth electrode 44 is electrically connected to the second input 52b of the integration circuit.

Figure 20:
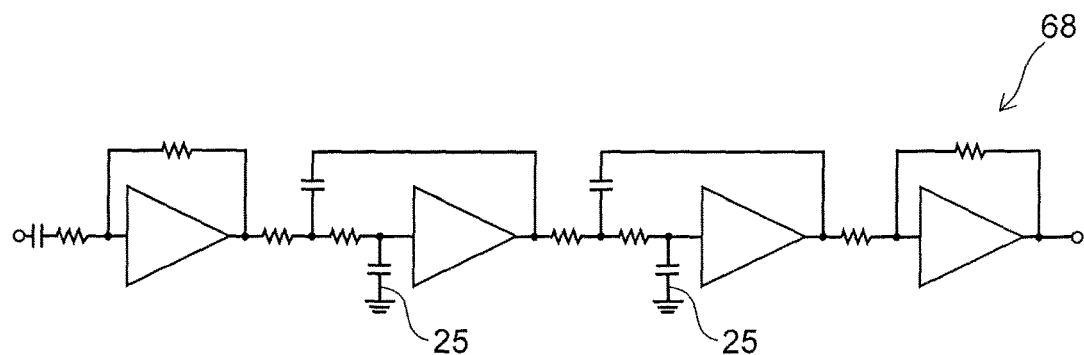
FIG. 20 is a circuit diagram illustrating a portion of the radiation detector according to the embodiment.

FIG. 20 is a circuit diagram illustrating a portion of the radiation detector according to the embodiment.

FIG. 20 shows an example of a waveform shaping amplifier 68. The waveform shaping amplifier 68 includes multiple amplifiers. The multiple amplifiers are connected in series (in multiple stages). The frequency characteristic and the amplification factor of the multistage amplifier are modified. Polarity inversion, filtering, and amplification are performed by the waveform shaping amplifier 68.

In the embodiment, for example, the other radiation (the α-rays and the β-rays) can be detected with high sensitivity also in an environment of high γ-rays dose. For example, the α-rays can be detected with high sensitivity also in an environment of high γ-rays dose and high β-rays dose.

According to the embodiments, a radiation detector can be provided in which improvement of the sensitivity and the selectivity is possible.

In this specification, the "state of being electrically connected" includes the state in which multiple conductive bodies are physically in contact, and a current flows between the multiple conductive bodies. The "state of being electrically connected" includes the state in which another conductive body is inserted between multiple conductive bodies, and a current flows between the multiple conductive bodies.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in radiation detectors such as metal members, capacitors, housings, charge-sensitive amplifiers, potential setters, processors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all radiation detectors practicable by an appropriate design modification by one skilled in the art based on the radiation detectors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A radiation detector, comprising:
    a metal member including a first portion and a second portion;
    a capacitor electrically connected to the second portion; and
    a first charge-sensitive amplifier electrically connected to the first portion, the first charge-sensitive amplifier being configured to output a signal corresponding to α-rays incident on the metal member.

2. The radiation detector according to claim 1, wherein the capacitor includes an organic semiconductor.

3. The radiation detector according to claim 1, wherein
    the capacitor includes a first terminal and a second terminal,
    the first terminal is electrically connected to the second portion, and
    the second terminal is set to a first potential.

4. The radiation detector according to claim 3, further comprising a first potential setter electrically connected to the first portion,
    the first potential setter being configured to cause a potential of the first portion to be different from the first potential.

5. The radiation detector according to claim 4, wherein at least a portion of the first radiation detecting portion functions as a capacitor electrically connected to the second portion.

6. The radiation detector according to claim 1, further comprising a first radiation detecting portion detecting radiation including at least one selected from the group consisting of β-rays and γ-rays.

7. The radiation detector according to claim 6, wherein at least a portion of the metal member overlaps at least a portion of the first radiation detecting portion.

8. The radiation detector according to claim 1, wherein the metal member generates a charge when radiation is incident on the metal member.

9. A radiation detector, comprising:
    a housing;
    a metal member including a first portion and a second portion, at least a portion of the metal member not being covered with the housing;
    a capacitor electrically connected to the second portion; and
    a first charge-sensitive amplifier electrically connected to the first portion.

10. The radiation detector according to claim 9, wherein the first charge-sensitive amplifier outputs a signal corresponding to α-rays incident on the metal member.

11. A radiation detector, comprising:
    a metal member including a first portion and a second portion;
    a first radiation detecting portion detecting radiation including at least one selected from the group consisting of β-rays and γ-rays, a third portion of the first radiation detecting portion being electrically connected to the second portion;

a first charge-sensitive amplifier electrically connected to the first portion, the first charge-sensitive amplifier being configured to output a first signal corresponding to α-rays incident on the metal member; and a second radiation detecting portion, the first radiation detecting portion being provided between the metal member and the second radiation detecting portion, the first radiation detecting portion detecting the β-rays, the second radiation detecting portion detecting the γ-rays.

12. The radiation detector according to claim 11, wherein the radiation including at least one pass through at least a portion of the metal member and that is incident on the first radiation detecting portion.

13. The radiation detector according to claim 11, wherein
the first radiation detecting portion includes an organic semiconductor layer, and
a thickness of the organic semiconductor layer is 1 mm or less.

14. The radiation detector according to claim 11, wherein a thickness of the metal member is not less than 10 nm and not more than 50 μm.

* * * * *